Patented July 6, 1937

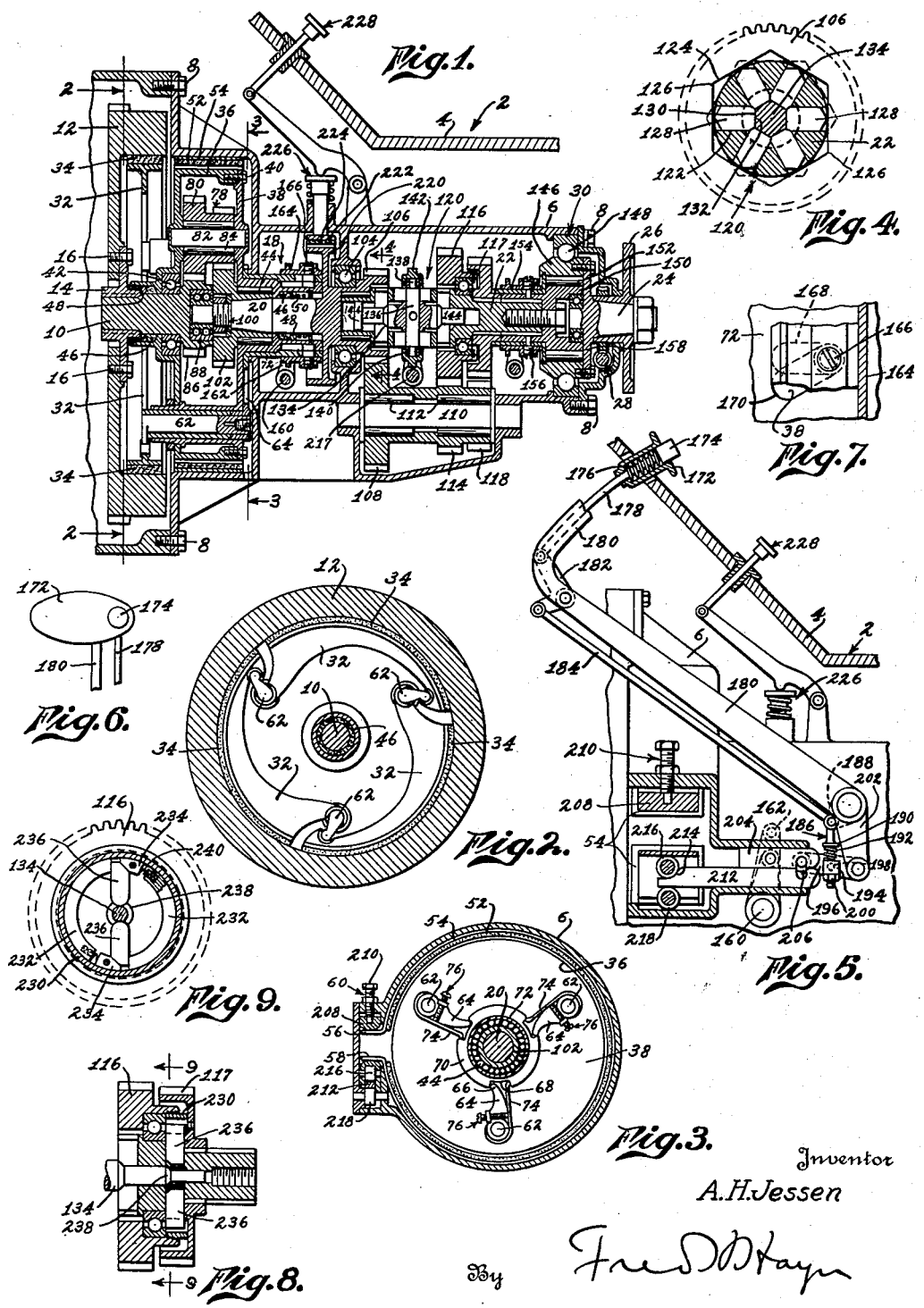

2,085,805

UNITED STATES PATENT OFFICE 2,085,805

TRANSMISSION AND OPERATING MECHANISM THEREFOR

Arnold H. Jessen, Los Angeles, Calif.

Application August 27, 1932, Serial No. 630,639
Renewed November 28, 1936

9 Claims. (Cl. 74—289)

My invention relates to multiple power clutch mechanisms, more particularly adapted for use in connection with motor vehicles, whereby at least four different speeds of operation of said vehicle, as well as free wheeling thereof, may be accomplished with a minimum number of parts, the apparatus forming a compact structure, easy to manipulate, effecting a certain and efficient operation, impossible to get out of order, and capable of being produced at a minimum expense, thus forming a marked improvement over apparatus heretofore proposed.

It accordingly is an object of my invention to provide a novel form of apparatus in which a drive shaft, upon which is mounted a suitable fly wheel, is adapted to actuate a set of driven shafts, at varying speeds, there being a drum mounted upon said drive shaft and the driven shaft contiguous thereto, said drum housing a set of interconnected multiple power devices, of novel or conventional form, and connected in any preferred way and means to said drive shaft and said contiguous driven shaft, means being associated with said fly wheel and said drum, whereby said driven shafts may be actuated by said drive shaft, when said fly wheel and drum are actuated in unison, or said drum is stationary and said drive shafts are operated by said drive shaft through said interconnected multiple power devices, whereby said varying speeds is accomplished.

It is also within the province of my invention to provide a novel form of clutch mechanism, associated in any preferred way with the fly wheel and drum of my apparatus, said mechanism comprising a set of friction shoes, operable by means of a set of devices, preferably fulcrumed on said drum and operable by any suitable means, such as a preferably flanged member, associated as preferred with the driven shaft contiguous to said drum, which devices may take the form of a spring opposed set of adjustable pawls, there being also provided means whereby the pressure of said friction shoes may be adjusted.

A still further object of my invention is to provide a novel form of plural packing means for packing the drive shaft and the driven shaft contiguous thereto, comprising duplicate packing elements, followers, and a preferably resilient means for continuously urging said packings against said shafts, whereby not only an efficient packing means is provided, but also that continual lubrication is provided for.

It is also within the province of my invention to provide a novel form of clutch mechanism for alternately clutching and unclutching contiguous driven shafts in which the transmission devices associated with said contiguous driven shafts are provided internally with polygonal cam faces, adapted to be alternately engaged by a set of preferably radially operable clutch devices, mounted in said clutch, or to engage the angles thereof to lock said transmission device to said driven shafts, said clutch mechanism being also provided with a double acting cam mechanism alternately to operate said transmission devices so that either of said transmission devices will be clutched to or unclutched from said contiguous driven shafts, there being also provided a means for guiding said cam mechanism to provide positive and noiseless operation, any suitable mechanism being also provided for shifting said clutch mechanism.

A still further object of my invention is to provide a novel form of mechanism for selectively operating the several clutch mechanisms, hereinbefore referred to, said mechanisms comprising suitable operating levers associated in any preferred way with a set of selectively operable sliding members, which, in turn are adapted by any preferred means, such as a crank or lever arm, to actuate said clutch mechanisms.

It is moreover within the province of my invention to associate with one of the driven shafts of my apparatus, a novel or conventional form of free wheeling apparatus, as well as a speed indicating and/or speed recording mechanism.

It is also an object of my invention to provide a novel form of braking device, operable by any preferred means, such as a spring retarded lever and plunger mechanism, which device is adapted for use in stopping the rotation of the transmission devices and mechanism so that any selective speed of the apparatus may be attained.

The above and further objects and advantages of my invention, as will hereinafter more fully appear, I attain by the construction described in the specification and illustrated on the drawing, forming a part of my application.

Reference is had to the accompanying drawing, in which similar reference characters denote similar parts. In the drawing, Fig. 1 is a fragmentary longitudinal-sectional view of my invention, with one of the clutch operating mechanisms omitted, Fig. 2 is a cross-sectional view, on a somewhat reduced scale, taken on the line 2—2, Fig. 1, looking in the direction of the arrows, Fig. 3 is a similar view, taken on the line 3—3, Fig. 1, also looking in the direction of the arrows, Fig. 4 is a similar view, on a somewhat enlarged scale, taken on the line 4—4, Fig. 1, looking in the direction of the arrows, Fig. 5 is a fragmentary cross-sectional view of a suggestive form of plural part clutch operating mechanism, illustrating also a suggestive form of operating mechanism for making brake application on the spinning clutch, as in Fig. 1, Fig. 6 is a fragmentary detail plan view of the operative end of the plural part operating mechanism depicted in Fig. 5, Fig. 7 is an enlarged detail part plan view and part sectional view of part of the mechanism for operating one of the clutches, Fig. 8 is a cross-sectional view of a modified form of synchronizing clutch mechanism, which may be used in connection with the clutch mechanism shown in Figs. 1 and 4, and Fig. 9 is a cross-sectional view, taken on the line 9—9, Fig. 8, looking in the direction of the arrows.

Describing my invention more in detail, the reference numeral 2 indicates generally a motor vehicle, of which the floor boards 4 are illustrated, my novel form of apparatus being positioned thereunder, which apparatus may be enclosed in a suitable housing 6, which may be any in practice suggested, and may be assembled in any preferred way, as by screw bolts 8, (Fig. 1).

The apparatus may comprise a suitable drive shaft 10, upon which is mounted a fly wheel 12, of any preferred form, and in any preferred way, as by means of a suitable splined coupling 14, which may be secured to said fly wheel in any preferred way, as by the bolts 16, said drive shaft 10 being adapted to drive the transmission mechanism, designated generally by the reference numeral 18 (Fig. 1) at varying speeds, as hereinafter more particularly to be described.

As seen in Fig. 1, I have provided a set of driven shafts 20, 22 and 24, of any preferred number, which shafts have associated therewith in any preferred way a set of transmission devices, which may in practice comprise suitable gears, mounted on said shafts in the manner and by the means presently to be described, means being also provided for clutching and unclutching said shafts in a manner and means, also presently to be described.

The driven shaft 24 may be provided with a suitable universal joint 26, and, if desired, any preferred form of mechanism, designated generally by the numeral 28, may be provided, whereby the speed of the vehicle may be indicated and/or recorded. Since said mechanism, which may comprise any form of gearing, as seen in Fig. 1, and may in practice be changed, further illustration and description are not deemed needed.

If desired, also, the driven shafts 22 and 24, may have associated therewith a free wheeling mechanism, designated generally by the reference numeral 30. Since, however, said mechanism may in practice be changed and in the present instance only enters into the general combination of my apparatus, further description and illustration, except as hereinafter more particularly described, such further description and illustration are not deemed needed.

The fly wheel 12 has associated therewith a set of friction shoes 32 (Figs. 1 and 2), of any preferred number, but preferably three, and arranged symmetrically and of segmental form, as seen more particularly in Fig. 2, which shoes are each equipped peripherally with a suitable lining 34, adapted to engage the inner cylindrical surface of the fly wheel 12, in the manner, and for the purpose presently to be described.

Mounted upon the drive shaft 10 and the contiguous driven shaft 20, is a suitable multiple power clutch gear drum or housing 36, which, if desired, may be provided with a suitable cover or closure 38, and preferably detachably associated with said drum, as by screw bolts 40.

The drum 36 is adapted to be intermittently or periodically rotated, or held stationary, as presently to be explained, and for this purpose the anti-friction bearings 42 and 44 which may comprise longitudinal and transverse anti-friction means of any preferred kind, are provided.

Further, to provide an adequate and efficient packing means, and a means for insuring that the lubricant may at all times be supplied to the various parts just described, I provide a suitable packing 46, surrounding the drive shaft 10 and the contiguous driven shaft 20, each of said packings having associated therewith suitable followers 48, urged against said packings by any preferred means, such as the springs 50, which, as seen in Fig. 1, take against, and are held in position by parts of the drum 36, and its cover or closure 38.

The drum 36 is provided on its periphery with a brake lining 52, associated as preferred with a suitable brake band 54, the ends of which band terminate in flat portions 56 and 58 (Fig. 3), the former being held stationary and adjustable by means of the nut, bolt and follower assembly 60 (Fig. 3), and the portion 58 being movable, in the manner presently to be described, so that brake application may be had on the drum 36, for a purpose also presently to be described.

The friction shoes 32 are fulcrumed on the drum or housing 36 by means of shafts 62, associated at one end thereof in any preferred way with said shoes, while the other ends of said shafts are preferably connected to the pawls or fingers 64, the inner ends 66 of which are adapted to be oscillated within the cut-out portions 68 of the flange 70 of the tubular sleeve 72. (Fig. 3, more particularly, and also Fig. 1.) It is to be noted that the friction shoes 32 extend circumferentially from the shafts 62 in a direction relative to the direction of movement of the driving member 12, which as seen in Fig. 2, may be considered as reverse clockwise. Thus the force of the motor acting against this shoe clutch has a "winding up" effect, which increases the frictional effect from the fly wheel to the driven clutch drum, Each of the pawls or fingers 64 is provided with a suitable spring means 74, preferably embracing said pawls or fingers, and anchored at one end in the cut-out portions 68, and at the other end to the pawls 64, any preferred adjusting means, such as the nut and screw bolt assembly 76, being provided whereby the tension of the springs 74 may be adjusted. The adjustable springs 74 are for the purpose of eliminating any possibility of locking the shoe clutch too severely,—these compensating springs insuring always a proper tension to start the load of a car or other mechanism, and giving a very flexible means of engaging the torque from a drive member to a driven member. Without these adjustable springs, the shoe clutches would be apt to grip too quickly or too strongly.

By means of the construction thus far described, with the fly wheel 12, engaged by the shoes 32, and the drum or housing 36 released from the brake band 54 and its lining 52, said fly wheel and drum may be operated in unison, to provide for certain speeds of the driven shafts, as presently to be described.

It will be apparent, however, that further means must be provided whereby the power may be multiplied. To this end the drum or housing 36 has provided therein a set of interconnected devices, such as planet carriers, sun gears and planet pinions, designated generally by the reference numeral 78, (Fig. 1), 80 indicating twin planet pinions, 82 indicating the shafts of said pinions, mounted to rotate in the anti-friction bearings 84, which may be of the roller type, said pinions being in mesh with the hollowed out gear 86, preferably integral with the drive shaft 10, within which hollowed out portion may be positioned the central anti-friction bearing 88 for the end of the contiguous driven shaft 20, a suitable lock nut and washer assembly 100 being provided to hold the parts in position.

The contiguous end of the driven shaft 20 is provided with a driven gear 102, whereby said driven shaft may be driven through said interconnected or intermeshed devices for multiplying the power of the transmission mechanism, as also presently to be described. Since said devices are more or less conventional, and may in practice be changed, further description and illustration are not deemed needed.

The other end of the driven shaft 20 is preferably somewhat enlarged, and is adapted for rotation within a suitable antifriction bearing 104, said end having mounted thereon a transmission device or gear 106, in mesh with a crossover gear 108, mounted upon a counter shaft 110, which shaft is adapted to be rotated within suitable anti-friction bearings 112.

On the counter shaft 110 is also mounted a counter shaft gear 114 in mesh with a main shaft gear 116 mounted upon the driven shaft 22, said driven shaft and said counter shaft 110 having also mounted thereon the reverse gears 117 and 118. Since, however, said reverse gears are immaterial insofar as the present invention is concerned, further description and illustration thereof are not deemed needed.

Also for the purpose of providing the varying speeds hereinbefore referred to, I have provided a novel form of clutch mechanism 120, Figs. 1 and 4, said clutch mechanism being of the double acting type and adapted to clutch or unclutch, as desired, either the driven shaft 22, or the driven shaft 20.

As seen more particularly in Fig. 4, the driven shaft 22 (and the driven shaft 20 as well, for the construction is almost identical, as presently to be explained) is perforated as at 122, the perforations being of any preferred number, and correspond to the cam faces 124, cut internally in the gears or transmission devices 106 and 116, said faces forming a polygon of any preferred number of sides, and forming angles 126, which faces and angles are adapted periodically to be engaged by the clutch devices 128, each of which has its one end positioned to engage the cam faces 124, when unclutched, or the angles 126, when clutched, while the other ends may be provided with inclined cam portions 130 to be engaged by the cam portions 132 on the slidable cam member 134 of the clutch 120.

The cam member 134 is adapted to be moved in two directions, so that either device 106 or 116 may be engaged with shaft 22 or disengaged, and for this purpose a transversely positioned pin 136, having reduced ends 138, against the washers 140 engages the assembly, being held in place by the shiftable yoke 142, to be shifted in the manner and by the means presently to be described.

For the purpose of a positive action of the clutch 120, each end of the cam member 134 may be provided with suitable guide parts 144, which, if desired, may be of different diameter, and operable within the driven shafts 20 and 22.

The free wheeling device or mechanism 30 will be briefly described, since it enters only into the combination with my apparatus, said device comprising an outer drive ring 146, mounted in an anti-friction bearing 148, a suitable cam 150, adapted periodically to be engaged by the rollers 152, for clutching and unclutching said cam, a sliding sleeve 154, mounted upon the driven shaft 22 being provided for actuating the device 30, the screw and pin construction 156 coacting with said sleeve whereby either conventional operation or free wheeling may be accomplished. The movement of the free wheeling device 30 is communicated to the driven shaft 24 by means of a flange 158, secured in any preferred way to the outer drive ring 146 and to the driven shaft 24, which in turn transmits its movement to the universal joint coupling 26.

The mechanism for actuating the clutches, may, of course, be any in practice suggested, but that shown on Fig. 5 is preferred. It may also be stated, that while I have shown said mechanism associated with the floor boards of the vehicle, said mechanism may be placed elsewhere, and still remain within the province of my invention.

As seen in Figs. 1 and 5, a crank arm 160 is mounted for oscillation on the casing 6, and has an end suitably connected with the yoke 162 (Fig. 1) of the flanged tubular sleeve 164 (Figs. 1 and 7) so said sleeve is slidable on the driven shaft 20, a suitable pilot screw pin or pins 166 secured to said sleeve 164, being operable in slots 168 and in oblique slots 170, the latter being in sleeve 72, for the purpose of oscillating said sleeve 72, being provided, which sleeve, as seen in Fig. 3, actuates the pawls 64 against the action of the compensating springs 74 to operate in turn shafts 62 to actuate the shoes 32 as hereinbefore described.

A suggestive mechanism for operating the crank arm 160 is shown in Fig. 5, and may comprise a foot pedal 172, in which is mounted a push button 174, adapted to be moved against the pressure of the spring 176, said spring preferably surrounding a rod 178, which may be curved, as shown, and may be associated with said button in any way in practice preferred.

The rod 178 may be depressed in the rear of a curved, and straight reach rod 180, by the button 174 and the other end thereof is secured to a bell crank 182, pivoted to the rod 180, the other arm of said bell crank being pivoted to a second reach rod 184, which in turn has its other end pivoted to a plunger device 186, and also to a crank arm 188, which crank arm is pivoted to the other end of the reach rod 180.

The plunger device 186 comprises a plunger 190, the action of which is opposed by a spring 192, abutting against a block 194, pivoted to a link 196 by means of a pivot pin 198, a nut 200 being provided for adjustment purposes.

The link 196 is pivoted to one end of a crank arm 202, the other end of which is pivoted to the rod 180, while the other end of said link 196 is pivoted to a slidable member 204 by means of a cross link 206. By depressing the button 174, therefore, the movement of the rod 178 is transmitted through the bell crank 182, rod 184, plunger assembly 186, link 196 to slide the slidable member 204 to operate the crank arm 160, which in turn actuates the yoke 162 (Fig. 1) to simultaneously oscillate the tubular flanged sleeve 164, to operate the pawls 64 and in turn the shoes 32, as previously described.

As seen in Fig. 5, for adjusting purposes, a block 208, adjustable by means of the screw bolt, nut and nut lock assembly 210, may be provided for adjusting the band 54. It will also be noted that the cross link 206 is pivoted to a second slidable member 212, so that any movement of the rod 180 by depressing the foot pedal 172 is communicated through the link 196 to said slidable member 212.

The other end of the slidable member 212 is preferably cut away as at 214, forming a cam portion, which cam portion functions to ride between the rollers 216 and 218, the latter being stationary on the casing 6 at any suitable point, while the roller 216 is adapted for movement to engage the band 54, when said cam portion is moved by the pedal mechanism just described, the roller 218 functioning as a guide, while the movable roller 216 is moved against the band 54 so that brake application will be made upon the drum 36, for the purpose presently to be described.

For the purpose of stopping the rotation of the transmission devices or gears, previously described, so that the transmission devices or gears may be locked, the brake device 220 (Fig. 1) is provided, which brake device comprises a drum-shaped member secured to and rotatable with the driven shaft 20.

To operate said brake device, and in turn to stop the rotation of the transmission devices or gears so that any speed desired may be accomplished, a brake shoe 222, preferably extending only part way around the brake 220, may be provided, which shoe is adapted to engage the lining 224, said shoe being independently operable from the remaining parts of the apparatus by a spring pressed plunger assembly 226, operable through the link and button assembly 228. See Figs. 4 and 5. Since the operation of said mechanism is obvious, and may in practice be altered to suit conditions met, further description is not deemed needed.

Should it be desired to provide the apparatus with a synchronizing mechanism, so that in the rotation of the transmission device the gear 116 shall rotate in unison with the driven shaft 22, the construction depicted in Figs. 8 and 9 may be provided.

In said figures an internal friction ring 230 is secured to the gear 117 in any preferred way, as by screw threads, and on said ring 230 are positioned a set of clutch shoes 232 (Fig. 9), and between said shoes are provided a set of stops 234, secured to the reverse gear 117. (Fig. 8.) A set of plunger spreaders 236, of any preferred number, are provided for engagement with said stops 234 and said shoes 232, so that the cam member 134, which may also be provided with an additional cam member 238, will actuate the plunger spreaders 236 so that the gear 116 will be locked for rotation in unison with the driven shaft 22, a set of compensating springs 240, engaging the ends of the stops 234, and the shoes 232.

It will be understood, of course, that the specific mechanism whereby the several clutch mechanisms hereinbefore described may in practice be changed, and I do not desire to limit myself to that shown and described.

The operation of the apparatus for accomplishing the various speeds should now be clear, which operation is as follows:

The brake device 220 is first operated through the button and lever mechanism 228, plunger mechanism 226, shoes 222, so that the rotation of the transmission devices or gears may be stopped to the end that the transmission gears may be locked to attain the speed desired. After this has been done, in order to attain.

First speed or low gear

Both push button 174 and pedal 172 are pressed simultaneously downward, causing both rods 180 and 184 to be simultaneously actuated. The slidable member 204, however, will not be actuated, since the crank arm 202 will actuate the link 194, carrying the plunger and spring mechanism 186 therewith bodily, thus permitting the said slidable member 204 above the second slidable member 212 to remain idle, the link 196, through the cross-bar 206 causing the cam portion 214 to spread the rollers 216 and 218 apart, the latter engaging the brake band 54 to clutch the multiple power clutch housing 36, thus holding said housing stationary.

At the same time the clutch mechanism 120, operable by the yoke 142, associated with the gear 116, is operated to the right in Fig. 1, by means of the crank 217, operable by any suitable means, exterior to the transmission casing 6, which causes the clutch devices 128 to ride over the straight cam faces 124 and to engage the angles 126 thereof as shown in dotted lines, Fig. 4.

This causes the pinions in the housing 36 to function, and the driven shaft 20 is driven through the pinion thereon in said housing, gear 106 engaging cross-over gear 108 on counter shaft 110, operating gear 116 to actuate the driven shaft 22, which in turn through the free wheeling device 30, actuates the universal joint 26, thus accomplishing first speed or low gear.

Second speed

This is accomplished by pressing down the pedal 172, but the button 174 is not touched. This causes the rod 178, reach rod 184, plunger 186 assembly to actuate the upper slidable member 204, which in turn actuates the crank arm 160 to oscillate the flanged tubular sleeve 164 by means of the yoke 162, to be slid to the left, Fig. 1, and oscillated, thus operating the pawls or fingers 64, against the pressure of the springs 74, the multiple power clutch drum 36 being released, thus locking said drum to the fly whel 12, so said drum and fly wheel will rotate in unison, the remaining parts, as described in connection with the first speed or low gear, being identically positioned as in said first speed.

Third speed

As in the case of the first speed or low gear, the pedal 172 and button 174 are pressed simultaneously downward, which causes the clutch drum 36 to be locked, as hereinbefore explained, the brake fly wheel shoes 32 being released in the manner and by the means previously described, but the clutch mechanism 120 is shifted to the left in Fig. 1, thus providing for multiple power through the gears and pinions 78 within the housing 36, driving the pinion on the contiguous driven shaft 20, gear 106 et seq. to the universal joint 26.

Fourth or high speed

This is accomplished by pushing down the pedal 172, but without pressing the button 174, all the various parts including the counter shaft 110 being in operation, there being a direct drive from the fly wheel 12 to the universal joint 26.

The described embodiment of the invention is to be understood as illustrative in all respects and not restrictive, and reference is to be had to the appended claims rather than the foregoing description to indicate the scope of the invention.

I claim as my invention:

1. A power transmission device comprising a drive shaft, a fly wheel fixed thereto hollowed out to provide an internal clutching area, a driven shaft mounted co-axially with the drive shaft, a drum mounted to turn upon adjacent end portions of said shafts, said drum and said shafts bearing cooperative gear elements to constitute a change speed unit, means for braking said drum at will, clutch shoes pivoted to rock on axes parallel to said shafts, to cooperate with the clutch area of said flywheel, mechanism mounted in and borne by said drum for rocking said clutch shoes, and means mounted concentrically with said shafts for controlling the clutch operating mechanism in said drums.

2. A power transmission device as set forth in claim 1 wherein the mechanism in the drum for operating the clutch shoes embodies a plurality of rock shafts connected to the respective shoes.

3. A power transmission device as set forth in claim 1 wherein the means for controlling the clutch operating mechanism has yielding elements incorporated therein with means for adjusting the tension thereof.

4. A power transmission device as set forth in claim 1 wherein the means for controlling the clutch operating mechanism in the drum embodies a sleeve mounted to turn upon, and with respect to, the axis of said shafts.

5. A power transmission device comprising a drive shaft bearing a member presenting a circular clutching area, a driven shaft mounted in axial alignment with the drive shaft, a drum mounted upon the adjacent end portions of said shafts, said drum and said shafts equipped with cooperative gear elements to constitute a change speed unit, said drum having friction members associated therewith to engage said clutching area, brake means for said drum, rock shafts bearing said friction members mounted in, and borne by, said drum, said rock shafts arranged in parallelism with the axis of the drive shaft, and means for simultaneously applying said braking means to said drum and operating said rock shafts to release said friction members, or for applying said friction members and releasing said brake.

6. A power transmission device as set forth in claim 5 wherein the clutch operating mechanism mounted in the drum is equipped with means for controlling the same embodied in a sleeve mounted to turn upon, and with respect to, said shafts.

7. A power transmission device as set forth in claim 5 wherein the clutch operating mechanism mounted in the drum is equipped with means for controlling the same embodying a sleeve mounted to turn about the shaft axes with means for effecting turning movement thereof and with a spring connection to said clutch operating mechanism of the drum, said spring connection having provision for adjustment to vary the degree of friction pressure exerted by said friction clutch members upon said clutching area.

8. A power transmission device, comprising a drive shaft bearing a member presenting a circular clutching area, a driven shaft mounted in axial alinement with the drive shaft, a drum mounted upon the adjacent end portions of said shafts, said drum and said shafts equipped with co-operative gear elements to constitute a change speed unit, said drum having friction members associated therewith to engage said clutching area, brake means for said drum, and rock shafts mounted in, and borne by said drum arranged in parallelism with said drive shaft, said friction members fixed to said rock shafts and extending in one direction therefrom circumferentially of said clutching area whereby frictional engagement of said members against said clutching area tends to become automatically more effective in one direction of driving movement.

9. A power transmission device as set forth in claim 8, wherein an operating device for said rock shafts is provided, having yielding elements adapted to equalize and temper the application of braking impulses.

ARNOLD H. JESSEN.